United States Patent
Helkey et al.

(10) Patent No.: US 7,254,293 B1
(45) Date of Patent: Aug. 7, 2007

(54) WAVELENGTH ROUTING OPTICAL SWITCH

(75) Inventors: Roger Jonathan Helkey, Montecito, CA (US); Shifu Yuan, Santa Barbara, CA (US); Xuezhe Zheng, Santa Barbara, CA (US)

(73) Assignee: Calient Networks, Inc., San Jose, CA (US)

( * ) Notice: Subject to any disclaimer, the term of this patent is extended or adjusted under 35 U.S.C. 154(b) by 156 days.

(21) Appl. No.: 10/879,639

(22) Filed: Jun. 28, 2004

Related U.S. Application Data

(60) Provisional application No. 60/484,112, filed on Jun. 30, 2003.

(51) Int. Cl.
*G02B 6/26* (2006.01)
*G02B 6/46* (2006.01)
*H04J 14/00* (2006.01)
*H04J 14/02* (2006.01)

(52) U.S. Cl. .................... 385/18; 385/16; 385/17; 398/45; 398/48; 398/49; 398/50; 398/79; 398/82; 398/83; 398/84; 398/87

(58) Field of Classification Search ........... 385/16–18; 398/45, 48–50, 82–84, 87
See application file for complete search history.

(56) References Cited

U.S. PATENT DOCUMENTS

| | | | |
|---|---|---|---|
| 4,244,045 A | 1/1981 | Nosu et al. | |
| 5,859,717 A | 1/1999 | Scobey et al. | |
| 5,960,133 A | 9/1999 | Tomlinson | |
| 6,097,859 A | 8/2000 | Solgaard et al. | |
| 6,285,500 B1 | 9/2001 | Ranalli et al. | |
| 6,389,190 B2 | 5/2002 | Sogaard et al. | |
| 6,501,877 B1 | 12/2002 | Weverka et al. | |
| 6,549,699 B2* | 4/2003 | Belser et al. | 385/24 |
| 6,750,995 B2 | 6/2004 | Dickson | |
| 7,072,539 B2* | 7/2006 | Wu et al. | 385/18 |
| 7,088,882 B2* | 8/2006 | Ducellier et al. | 385/17 |
| 2003/0031406 A1* | 2/2003 | Saida et al. | 385/27 |
| 2003/0215179 A1* | 11/2003 | Mcguire | 385/24 |
| 2004/0067014 A1 | 4/2004 | Hollars et al. | |
| 2005/0063641 A1* | 3/2005 | Neilson et al. | 385/18 |

FOREIGN PATENT DOCUMENTS

WO    WO01/57902 A2    8/2001

OTHER PUBLICATIONS

Tsai, J.C. et al., "1xN2 Wavelength-selective switches with high fill-factor two-axis analog micromirror arrays", OFC 2004, Ls QAngeles, Paper MF42 (2004).*
Patel, J.S. et al., "Liquid Crystal and Grating-Based Multiple-Wavelength Cross-Connect Switch", IEEE Photonics Technology Letters, vol. 7, No. 5, May 1995, pp. 514-516.

(Continued)

*Primary Examiner*—Frank G. Font
*Assistant Examiner*—Derek L. Dupuis
(74) *Attorney, Agent, or Firm*—Blakely, Sokoloff, Taylor & Zafman LLP

(57) ABSTRACT

An optical switch for routing arbitrary wavelengths between optical fibers in optical networks. The optical switch may include a highly wavelength dispersive element together with a spatially dispersive element to separate the wavelengths. Broadband switch inputs and outputs may be provided for adding and dropping arbitrary wavelengths at each node of the network. Fiber demultiplexers and multiplexers may also be used to reduce the impact of mirror array yield on switch functionality.

15 Claims, 11 Drawing Sheets

OTHER PUBLICATIONS

Suzuki, S. et al., "Integrated Multichannel Optical Wavelength Selective Switchse Incorporating an Arrayed-Waveguide Grating Multiplexer and Thermooptic Switches," J. of Lightwave Technology, 16(4), pp. 650-655 (Apr. 1998).

Lin, L.Y. et al., "On the expandability of free-space micromachined optical cross connects," J. Lightwave Tecnol., vol. 18, pp. 482-489, Apr. 2000.

D.M. Marom, D.M. et al., "Wavelength-selective 1x4 switch for 128 WDM channels at 50 GHz spacing," OFC 2002 PostDeadline papers, FB7-1, (2002).

Zheng, X. et al., "3D MEMS Photonic cross-connect switch design and performance", IEEE Journal of Selected Topics in Quantum Electronics, 9(2), 571-578 (Mar./Apr. 2003).

Tsai, J.C. et al. "1xN2 Wavelength-selective switches with high fill-factor two-axis analog micromirror arrays", OFC 2004, Los Angeles, Paper MF42 (2004). nttp://www.Photonics.ucla.edu/pdf/IPL_UCLA_JCTsai_OFC_2004_idI55.pdf.

Tsai, J.C. et al., "Open-Loop Operation of MEMS-Based 1xNWavelength-Selective Switch With Long-Term Stability and Repeatability" IEEE Photonics Technology Letters, 16(4), pp. 1041-1043 (Apr. 2004). http://www.photonics.ucla.edu/pdf/IPL_UCLA_JCTsai_PhotonicsTechnologyLetters_2004_id157.pdf.

J.I. Dadap et al. "Modular MEMS-Based Optical Cross-Connect With Large Port-Count", IEEE Photonics Technology Letters, vol. 15, No. 12, Dec. 2003, pp. 1773-1775.

\* cited by examiner

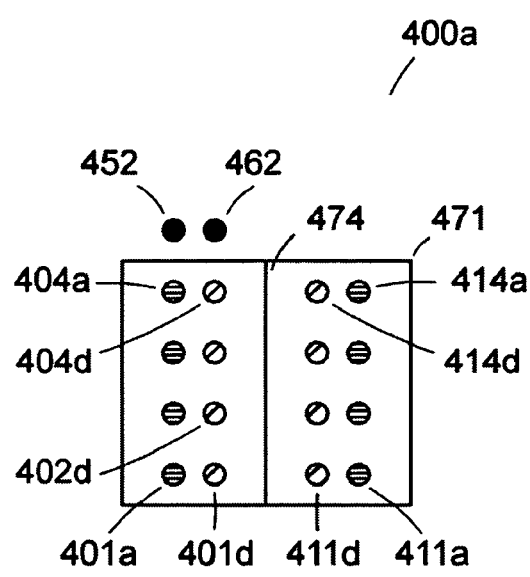
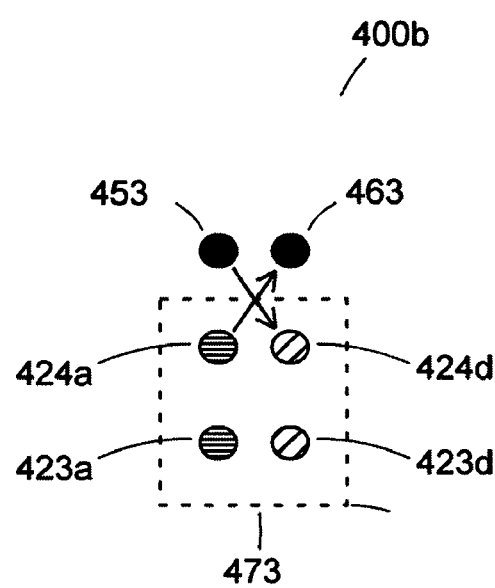
Figure 4a
Figure 4b

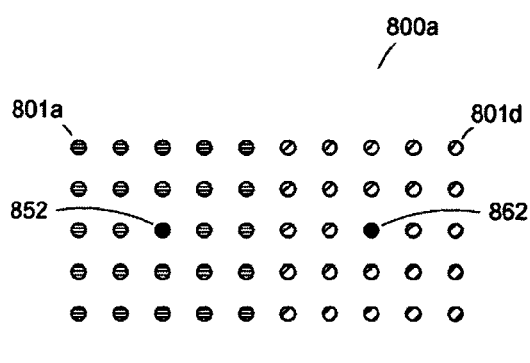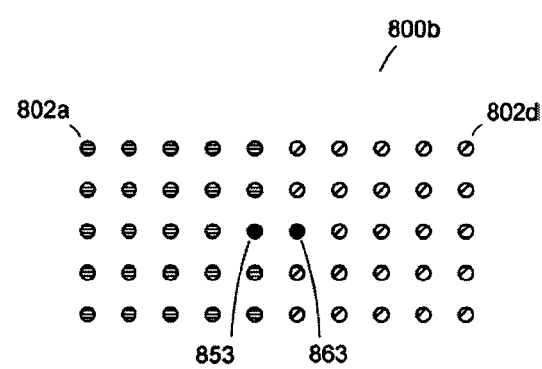
Figure 8a                    Figure 8b

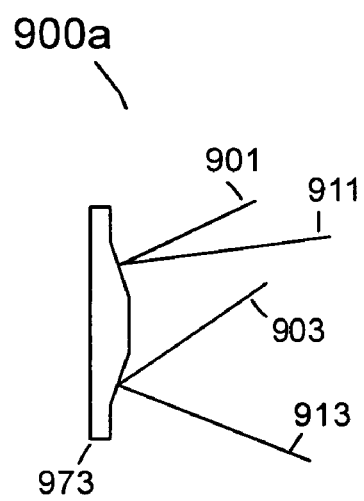
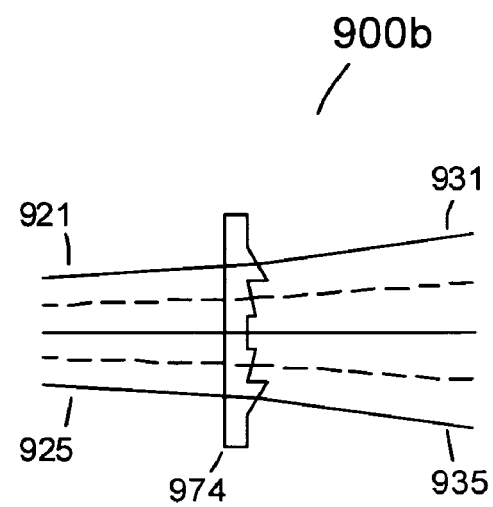
Figure 9a
Figure 9b

WAVELENGTH ROUTING OPTICAL SWITCH

REFERENCE TO RELATED APPLICATION

This application claims the benefit of U.S. Provisional Application No. 60/484,112, filed Jun. 30, 2003, which is herein incorporated by reference.

TECHNICAL FIELD

The present invention relates generally to optical switches and, in particular, to the switching of multiple signals carried on different wavelengths within multiple optical fibers of a telecommunications network.

BACKGROUND

Telecommunications systems typically using rings of optical fibers, where each optical fiber is able to carry a number of digital signals at different optical wavelengths. These fibers are connected to multiplexing and demultiplexing equipment that combine and separate the optical wavelengths. These fibers are interconnected into networks. Typically these networks have been arranged in rings, each fiber carrying approximately forty wavelengths.

A method for optical wavelength multiplexing and demultiplexing to provide free-space collimated optical beams at separate wavelengths that interface directly with a free-space optical switch is disclosed in Patel and Silverberg "Liquid Crystal and Grating-Based Multiple-Wavelength Cross-Connect Switch", IEEE Photonics Technology Letters, Vol. 7, pp. 514–516, 1995(hereinafter "Patel"), using grating dispersion to separate the optical beams from two input and two output fibers. The number of optical input and outputs ports can be increased over the wavelength dispersive switch method discussed in Patel using an optical switch comprised of a two-dimensional array of micromirrors between two gratings discussed in U.S. Pat. No. 6,097,859 of Solgaard et al. One problem with such an implementation is that it is difficult to fabricate mirror arrays with perfect yield, leading to blocking network operation due to any defective mirrors in the mirror array. Wavelength independent input and output ports of the wavelength selective switch also are needed, in order to provide the ability to add and drop arbitrary wavelengths as required in mesh telecommunications networks.

Another optical switch discussed in U.S. Pat. No. 6,549,699 of Belser (hereinafter "Belser") provides the ability to add and drop fiber ports using a single mirror to select the add-port fiber, which also determines the drop-port fiber and, therefore, does not allow for independent selection of add and drop ports. Such a switching configuration may not be useful in existing mesh telecommunications networks. Moreover, the switching configuration of Belser may only be scaleable to a few add-ports and drop-ports. The more add-ports and drop-ports that are required by a network, the larger the spacing between the mirror and the grating of Belser, which leads to mechanical drift over temperature. As a result, the optical switch discussed in Belser may not operate with large numbers of add and drop ports over a need temperature range.

BRIEF DESCRIPTION OF THE DRAWINGS

The present invention is illustrated by way of example and not intended to be limited by the figures of the accompanying drawings in which:

FIG. 4a illustrates one embodiment of the relative position of the add-port and drop-port beams within a free-space portion of the optical wavelength switch, relative to input and output beams and a reflective prism.

FIG. 4b illustrates simultaneous adding and dropping wavelengths with a single mirror control.

FIG. 8a illustrates the relative position of the add-port and drop-port beams within a free-space portion of an alternate embodiment of an optical wavelength switch, relative to the input and output beams.

FIG. 8b illustrates resulting positions of input and output beams relative to columns of add-port and drop-port beams at a mirror array.

FIG. 9a illustrates one embodiment of a reflective spatially-dispersive element.

FIG. 9b illustrates an alternative embodiment of a transmissive spatially-dispersive element.

DETAILED DESCRIPTION

In the following description, numerous specific details are set forth such as examples of specific systems, circuits, components, etc. in order to provide a thorough understanding of embodiments of the present invention. It will be apparent, however, to one skilled in the art that these specific details need not be employed to practice embodiments of the present invention. In other instances, well known components or methods have not been described in detail in order to avoid unnecessarily obscuring embodiments of the present invention. The term "coupled" as used herein means coupled directly to, or indirectly through one or more intervening components. Moreover, "coupled" may mean physically and/or optically coupled as used herein. A line used in a figure may represent a single beam or multiple individual wavelength beams as provided herein. It should also be noted that embodiments of the present invention may be discussed herein in relation to specific frequencies, wavelengths, inputs, outputs, switches, etc., and numbers thereof, only for ease of illustration and are not so limited.

An optical switch for routing arbitrary wavelengths between optical fibers in optical networks is described. In one embodiment, the optical switch routes wavelengths using a highly wavelength dispersive element together with a spatially dispersive element to separate the wavelengths. In one embodiment, broadband switch inputs and outputs may be provided for adding and dropping arbitrary wavelengths at each node of the network. Fiber demultiplexers and multiplexers may also used to reduce the impact of mirror array yield on switch functionality.

Figure 1:
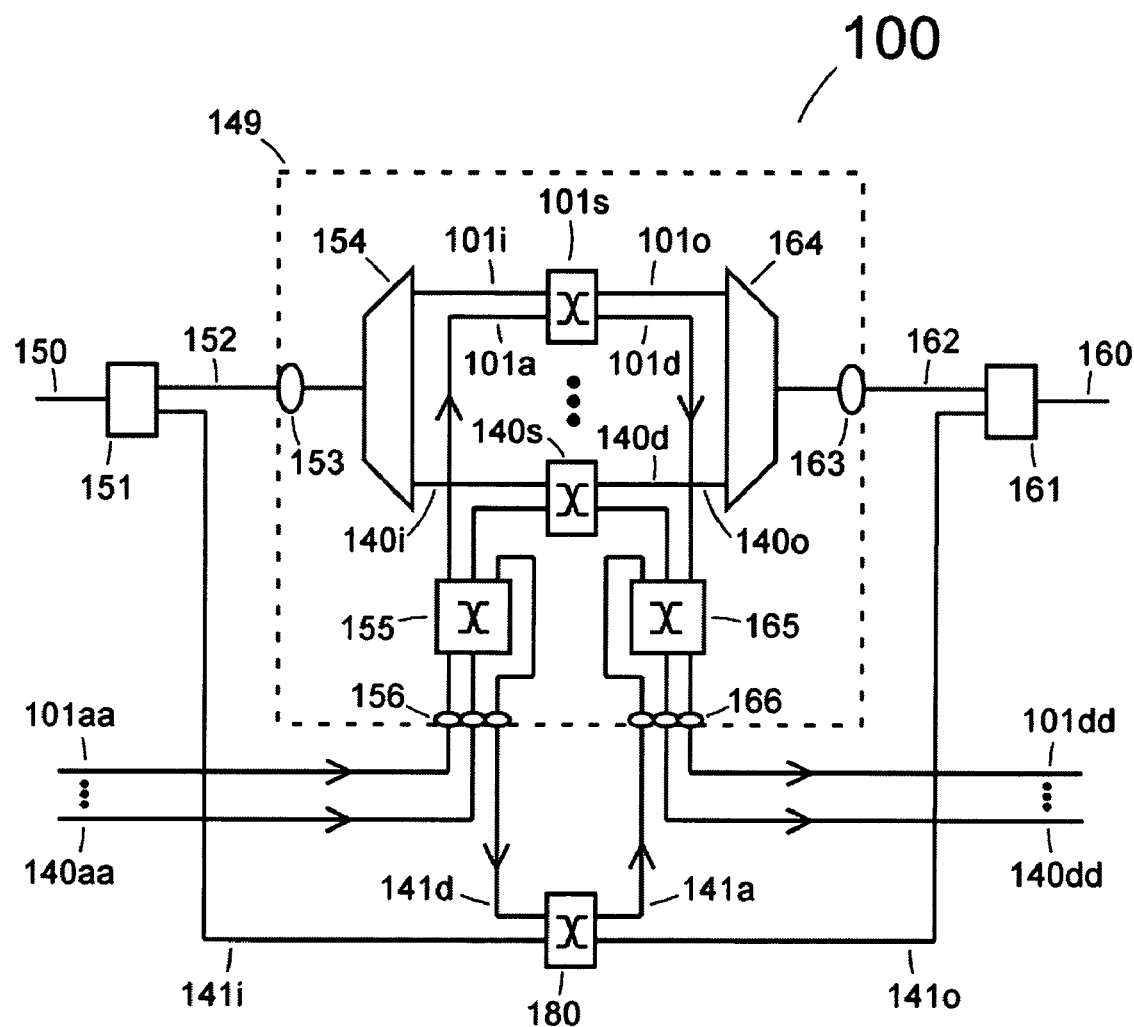
FIG. 1 illustrates one embodiment of an optical wavelength switch.

FIG. 1 illustrates one embodiment of an optical wavelength switch. Switch 100 is a fiber coupled wavelength switch that switches any wavelength from one or more input fibers to one or more output fibers, while allowing more than one wavelengths to be dropped to fiber-coupled drop ports 101dd and more than one wavelengths to be added from fiber coupled add-ports 101aa. The majority of the wavelength switching is performed in a free-space wavelength switch 149. In order to accommodate a finite yield in free-space wavelength switch 149, fiber coupled demultiplexers 151 and fiber-coupled multiplexers 161 drop and add individual wavelengths corresponding to non-working ports of free-space wavelength switch 149.

In this exemplary embodiment, switch 100 has a single fiber input 150 carrying 40 wavelengths spaced in wavelength by 100 GHz on the standard ITU grid. Input fiber 150 is single mode fiber, for example, SMF-28 from Corning of Corning, N.Y. Input demultiplexer 151 separates one wavelength 141i corresponding to a non-working wavelength of free-space optical switch 149. The remaining 39 wavelengths are sent to free-space wavelength switch 149 by fiber 152, or 40 wavelengths if all wavelengths of switch 149 are fully functional.

Free-space switch 149 converts all fiber inputs 141a, 152, and forty add-ports 101aa–140aa to free-space optical beams, and couples all output free-space beam into output optical fibers 141d, 162, and forty drop-ports 101dd–140dd using lenses 153 and 163 and lens arrays 156 and 166. Optical beams propagate in free-space if they propagate without confinement of a dielectric waveguide such as optical fiber. Input 152 carrying up to 40 wavelengths is converted to a free-space collimated beam by input lens 153. A collimated optical beam maintains an approximately constant optical beam cross-section, except for a slow variation in cross-section due to optical diffraction. The effect of optical diffraction can be minimized by using sufficiently large optical beams that propagate as Gaussian beams. Design of optical switches using Gaussian beams is well known to those skilled in the art, for example, as described in L. Y. Lin et al., J. LightwaveTechnol., vol. 18, pp. 482–489, April 2000 and X. Zheng et al., "3D MEMS Photonic cross-connect switch design and performance", IEEE Journal of Selected Topics in Quantum Electronics, 9(2), 571–578 (2003). Alternatively, other fibers, numbers of wavelengths, frequency spacings, ports and wavelength bands may be used.

In one embodiment, free-space wavelength switch 149 is configured to separate all 40 input wavelengths from fiber 150 into 40 separate optical beams 101i–140i using free-space demultiplexer 154. An array of 40 independent 2×2 free-space optical switches select whether to send input beams 101i–140i to output beams 101o–140o or to send any of input beams 101i–140i to any of drop-port free-space beams 101d–140d. Output beams 101o–140o are combined using free-space multiplexer 164. If any input free-space beams 101i are propagated to any of drop-port free-space beams 101d, the corresponding add-port beam 101a is propagated to free-space output beam 101o.

In this exemplary embodiment, two 40×41 cross-bar optical switches 155 and 165 are used to provide independent interconnectivity, allowing any input wavelength from input fiber 150 to be sent to any drop-port output fiber 110dd, and allowing any wavelength from add-port input fiber 101aa to be sent to an output wavelength on output fiber 160. Using optical switches 155 and 165 allows any add-port connection to be changed without interrupting any drop-port connection, and any drop-port connection to be changed without interrupting any add-port connection.

Any wavelength that is not operational in free-space optical switch 149 due to the yield of internal elements is routed from input fiber to output fiber using 2×2 fiber-coupled switch 180. This input-output wavelength routing is set up by connecting fiber input 141i to fiber output 141o through switch 180. A drop path can be set up through switch 180, by directing input 141i to drop port 141a, which simultaneously connects drop path 141d to output 141o.

In another embodiment, crossbar switches 155 and/or 165 are external fiber-coupled switches, rather than free-space optical switches within free-space wavelength switch 149. In another embodiment, crossbar switches 155 and/or 165 are omitted. Without crossbar switches 155 and 165, optical switch 300 can still add 40 add-port wavelengths and drop 40 drop-port wavelengths. In this case, the selection of the drop-port fiber determines which fiber the add-port wavelength is incident from. Similarly, selection of the add-port fiber determines which fiber the drop-port wavelength is directed to. If only one of crossbar switches 155 or 165 is implemented, arbitrary add-port fibers and drop-port connections still can be obtained. However, the add-port connection would be interrupted temporarily when the drop-port fiber is changed, or the drop-port connection would be interrupted temporarily when the add-port fiber is changed.

Figure 2:
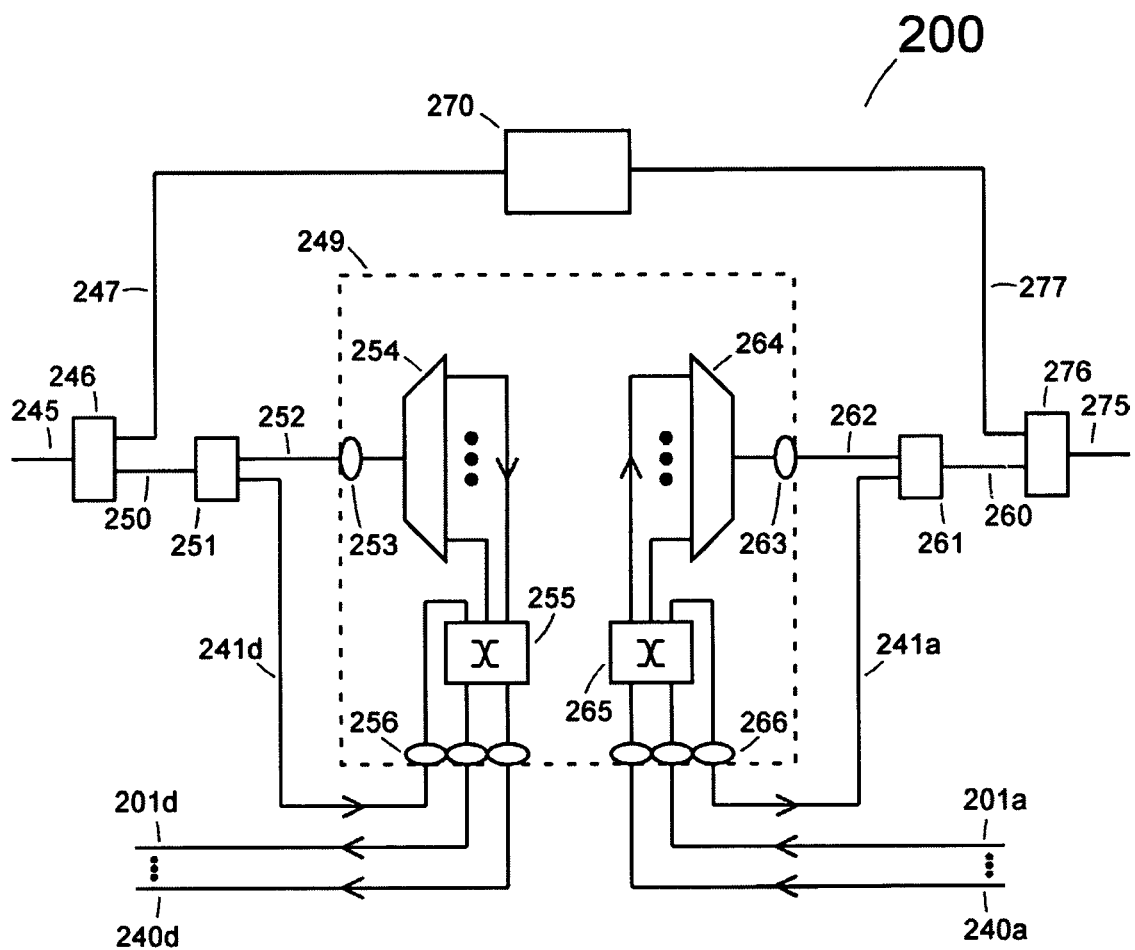
FIG. 2 illustrates an alternate embodiment of a wavelength switch using a wavelength blocker and wavelength switching of the add-ports and drop-ports.

FIG. 2 illustrates an alternative embodiment where the direct wavelength switching from input fiber 245 to output fiber 275 is provided by a fiber-coupled wavelength blocker 270, that can pass or block any wavelength of the 40 input wavelengths from fiber 245. Wavelength blockers are commercially available from manufacturers such as JDS Uniphase of Ottawa, Canada and Avanex of Fremont, Calif., USA. Most of the optical power from input fiber 245 carrying 40 wavelengths is directed to wavelength blocker 270 through optical power splitter 246 and optical fiber 247. A smaller fraction of the optical power carrying 40 wavelengths from input fiber 245 is sent to drop fiber 250. Wavelength blocker 270 passes the desired input wavelengths to fiber output 277, and blocks the other wavelengths. Most of the output power from fiber 277 is coupled to the output 275 carrying 40 wavelengths by optical power splitter 276. A smaller fraction of the signals from add-fiber 260 are send to output port 275 by optical power splitter 276. In another embodiment, circulators may be used for optical power splitters 246 and 276 instead of optical power splitters, and drop-port fiber wavelengths 250 may be obtained by reflection from wavelength blocker 270.

Free-space switch 249 converts all fiber inputs 241d, 252, and forty add-ports 201aa–240aa to free-space optical beams, and couples all output free-space beam into output optical fibers 241a, 262, and forty drop-ports 201dd–240dd using lenses 253 and 263 and lens arrays 256 and 266. Free-space optical switch 249 connects input wavelengths from drop-port fiber 250 to drop-port fibers 201a–240a using free-space demultiplexer 254 and switch 255, and connects add-ports 201d–240d to output add-port fiber 260 using switch 265 and free-space multiplexer 264. In order to accommodate a finite yield in free-space wavelength switch 249, fiber coupled demultiplexers 251 and fiber-coupled multiplexers 261 drop and add individual wavelengths 241d and 241a corresponding to non-working ports of free-space wavelength switch 149. The remaining input wavelengths and output wavelengths are directed too and from switch 249 using fibers 252 and 262.

In this exemplary embodiment, two 40×41 cross-bar optical switches 255 and 265 that can propagate any free-space input optical beam to any free-space output optical beam are used to provide independent interconnectivity, allowing any input wavelength from drop-port fiber 250 to be sent to any drop-port output fiber 201d–240d, and allows any wavelength from add-port input fibers 201a–240a to be sent to an output wavelength on add-port fiber 260.

Fiber-coupled demultiplexer 251 drops any wavelength corresponding to a non-working wavelength of free-space switch 249. Optical cross-bar switch 255 has an additional input 241d that allows the drop-port wavelength 241d to be send to any drop-port fiber 250. Fiber-coupled multiplexer 261 allows an add-port input 201a at a non-working wavelength of free-space switch 249 to be added to add-port fiber 260 through optical cross-bar switch 265.

Free-space optical switch 249 may be constructed in a similar manner to free-space optical switch 149. However, free-space optical switch 249 is simpler than free-space optical switch 149, as wavelength blocker 270 provides low-loss interconnect between wavelengths from input fiber 245 to output fiber 275, easing the loss and interconnectivity requirements of free-space switch 249 compared to free-space switch 149.

Figure 3:
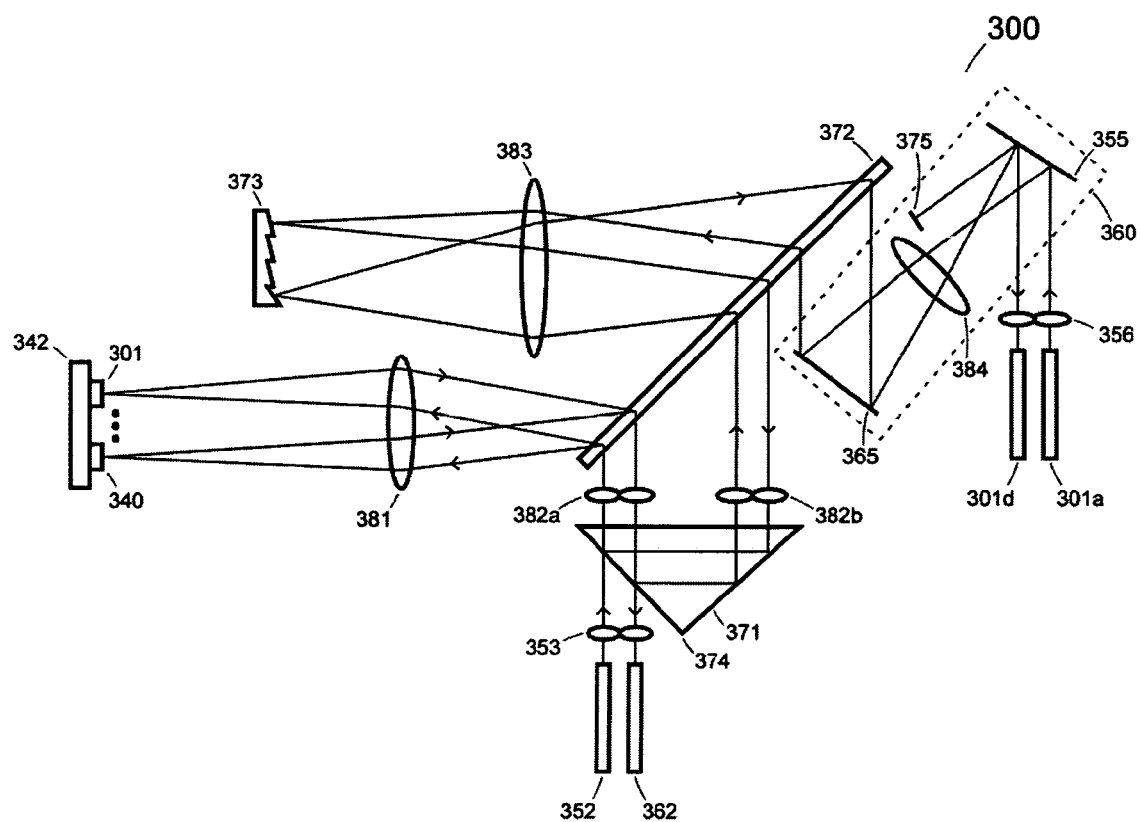
FIG. 3 illustrates one embodiment of a free-space portion of the optical wavelength switch.

FIG. 3 illustrates one embodiment of a free-space portion of the optical wavelength switch. In this embodiment, free-space optical switch 300 may correspond to free-space optical switch 149 or free-space optical switch 249. Lens array 353 collimates fiber input 352, corresponding to fiber 152, to form a free-space collimated input beam. Lens array 353 also couples an output collimated beam into output fiber 362 corresponding to output fiber 162. Lens arrays fabricated from silicon wafers are available from manufacturers such as Advanced Microoptic Systems of Germany.

The collimated free-space beams from input fiber 352 pass over folding prism 371 to dispersive grating 372. Grating 372 separates the 40 wavelengths from input fiber 352. Lens 381 focuses each of the 40 input wavelengths onto a different mirror 301–340 of mirror array 342. In one embodiment, mirror array 342 includes 40 micromirrors formed on a silicon substrate, each micromirror able to rotate in two axes and each directing a single input wavelength. Micromirrors of this type have been developed, for example, as discussed in Tsai, J. C. et al. "1×N2 Wavelength-selective switches with high fill-factor two-axis analog micromirror arrays", OFC 2004, Los Angeles, Paper MF42 (2004).

Each micromirror 301–340 can direct its corresponding wavelength back through lens 381 and grating 372 to lens array 353 and output fiber 362. Alternately, each mirror of array 342 can direct an input wavelength to a drop port, by steering the beam to folding prism 371. The diameter of each drop-port free-space optical beam is reduced by reverse propagation through a beam expander comprising an array of lenses 382a and an array of lenses 382b. In some applications the Gaussian beam parameters of the free-space optical beams can be chosen such that the second array of lenses 382b is not needed in order to adjust the free-space optical beam diameter.

Each wavelength that is directed to a drop port is first steered by mirror array 342 to one of four drop-port positions 401d–404d shown in FIG. 4a. The position of the free-space add-port beams 401a–404a and drop-port beams 401d–404d are shown relative to the folding prism 471 corresponding to folding prism 371 of FIG. 3. The add-ports and drop ports reflect around the prism vertex 474 corresponding to vertex 374, to form another set of add-port positions 411a–414a and drop-port positions 411d–414d.

Ten wavelengths having every fourth wavelength including wavelengths 1, 5, 9, and higher are sent to drop-port position 401d. The next set of ten wavelengths including wavelengths 2, 6, 10, and higher are sent to position 402d. Similarly, the next set of ten wavelengths are sent to position 403d, and the final set of ten wavelengths are sent to position 404d. As a result, mirror array 342 acts as a wavelength interleaver for drop-port wavelengths, and each drop-port position has up to 10 wavelengths at 400 GHz wavelength spacing. In one embodiment, there are eight drop-port positions, where four additional drop-port positions are provided for redundancy.

The drop-port optical beams pass through dispersive grating 372 a second time, to lens array 383, and then to spatially dispersive element 373. Spatially dispersive element 373 has ten facets that increase the angular dispersion from the ten wavelengths in each drop-port position 401d–404d. The facets on spatially dispersive element 373 producing discontinuous changes in optical beam angle as a function of optical beam position. Each wavelength reflects back from spatially dispersive element 373 and passes back through lens array 383 at a different angle, arriving at grating 372 at a different position. It should be noted that although switch 300 is illustrated with a single grating 372 through which optical signals pass through different times at different positions, in an alternative embodiment, grating 372 (and the other gratings discussed below) may be composed of two or more distinct grating elements.

Each drop port beam, now carrying a single wavelength, is incident on mirror array 365 containing 40 mirrors for the 40 drop-port wavelengths, where each mirror in array 365 is able to rotate in two axes. Mirror array 355 also contains 40 mirrors for the drop-port wavelengths. Mirror arrays 355 and 365 together with lens 384 form a nonblocking optical cross-connect switch 360, allowing any drop-port wavelength to be connected to any of 40 drop-port fibers 301d–340d, although only one drop port 301d is shown for clarity. Lens array 356 couples the free-space collimated drop-port beams into drop-port fibers 301d–340d. Lens array 384 counteracts Gaussian beam diffraction through the switch, and reduces optical clipping loss by reducing the optical beam size at each mirror of mirror arrays 355 and 365.

In an alternative embodiment, the spatial separation of wavelengths from drop-port beams may be performed by arrays of interference filters, rather than by grating 372 and spatially dispersive element 373. Interference filters pass a band of wavelengths, and reflect the other wavelengths. Interference filters are commercially available from manufacturers such as AOC of Pleasanton, Calif. In an alternate embodiment, there would be an additional beam expander between grating 372 and mirror array 365, in order to change the size of the beams from the beam size leaving grating 372 to the beam size at mirror array 365. In another embodiment, mirror arrays 355 and 365 may be replaced by a single larger mirror array containing both input and output mirrors, and lens 384 may be replaced by a curved fixed mirror to form a reflective optical switch.

The 40 add-port optical fibers 301a–340a are connected to optical switch 300 in the same way as the drop-port optical fibers 301d–340d, although only one add-port optical fiber 301a is shown for clarity. Lens array 356 collimates fiber inputs 301a–340a to form free-space collimated input beams. Mirror arrays 355 and 365 each contain an additional 40 mirrors for switching any add-port fiber to any add-port wavelength. The add-port collimated beams pass from mirror array 365 through lens array 383 to spatially dispersive element 373.

Fixed mirror 375 routes signals 141a and 141d to the opposite sides of switches 155 and 165 of FIG. 1, to allow bypassing a non-working wavelength of wavelength switch 300. Fixed mirror 375 allows an add-port (not shown) corresponding to add-port 141a of FIG. 1 to connect to any drop point 301d–340d, and allows any add-port 301a–340a to connect to a drop port (not shown) corresponding to drop port 141d of FIG. 1.

The add-port beams reflect off of spatially dispersive element 373, through lens array 383 to grating 372, then to lens arrays 382b and 382a that act as beam expanders when propagating in this direction. Prism 371 folds the add-port optical beams, and directs them to grating 372. The add-port optical beams pass through lens 381 to mirror array 342. The add-port beams reflect off of mirror array 342, and can be steered back through lens 381 to grating 372 by mirrors 301–340, and over folding prism 371 to output fiber 362. Lens array 353 couples the free-space optical beam containing up to 40 wavelengths to output fiber 362.

The use of a single mirror to steer the input beam to a drop port and simultaneously steer an add-port to an output beam is illustrated in FIG. 4b. This simultaneous switching can be achieved with a single mirror by precise positioning of the add-port free-space beams relative to the drop-port free-space beams. Two of the add-port beams 423a and 424a corresponding to add-port beams 403a and 404a are shown relative to prism 473 corresponding to prism 471. Similarly two of the drop-port beams 423d and 424d corresponding to drop-port beams 403d and 404d are shown. In one position of a mirror from array 342, a wavelength in input beam 453 corresponding to input beam 452 is connected to drop-port position 424d. This mirror position simultaneously connects a wavelength from add-port 424a to output port 463 as illustrated in FIG. 4b with the solid arrows showing the interconnection of ports.

In another position of a mirror from array 342, a wavelength in input beam 453 corresponding to input beam 452 is connected to drop-port 423d. This mirror position simultaneously connects a wavelength from add-port 423a to output port 463. In another position of a mirror from array 342, a wavelength in input beam 453 corresponding to input beam 452 is connected to output beam 463 corresponding to output beam 462.

Figure 5:
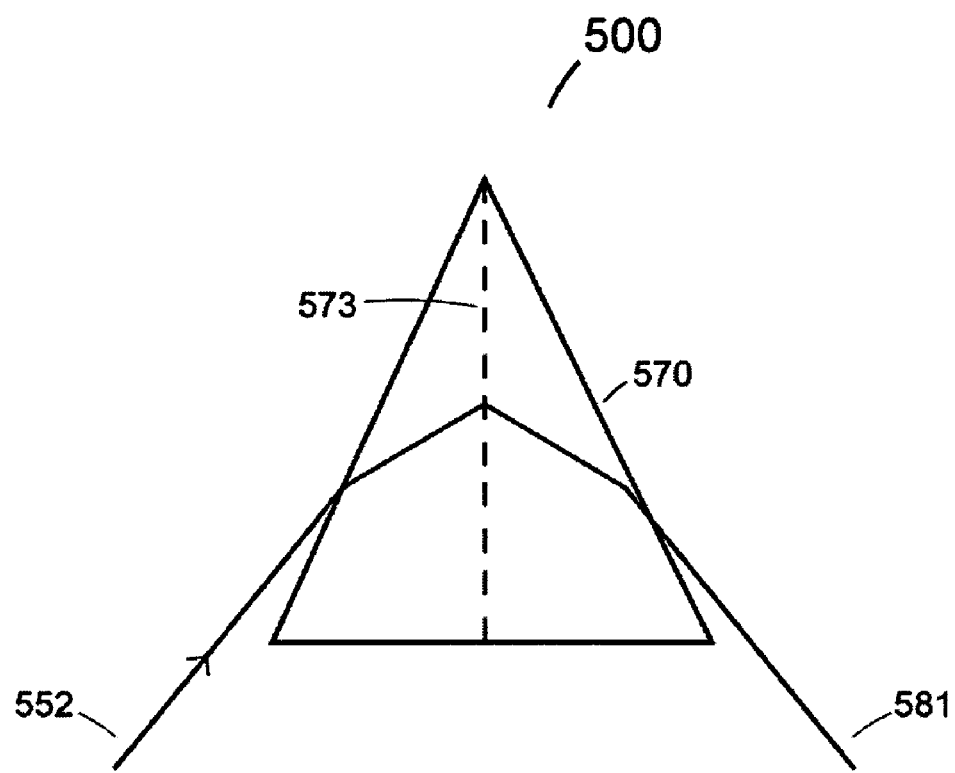
FIG. 5 illustrates one embodiment of a dispersive grating device used to convert the wavelength separation of optical beams into angular separation.

FIG. 5 illustrates one embodiment of a dispersive grating device used to convert the wavelength separation of optical beams 552 into angular separation of optical output beams 581. The dispersive grating element 500 corresponds to grating 372. A grating 573 is placed in the middle of a prism 570. The combination of grating 573 and prism 570 produces a larger angular dispersion than a grating along. This type of grating-prism structure is available from manufacturers such as Wasatch of Logan, Utah and Kaiser Optical Systems of Ann Arbor, Mich.

Figure 6:
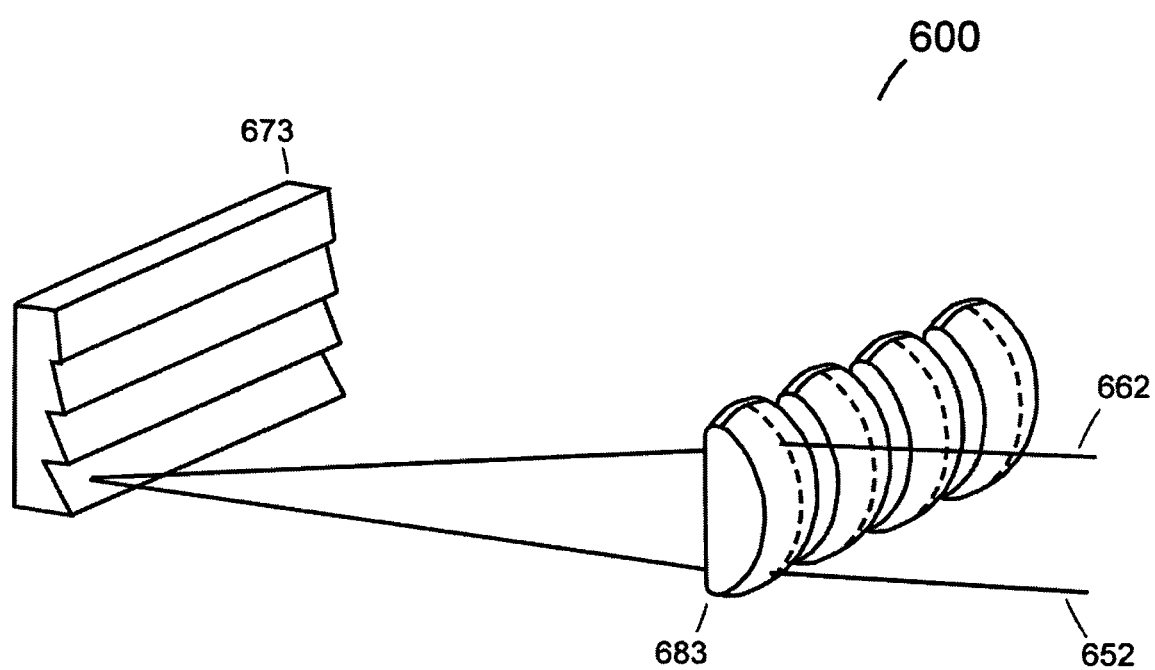
FIG. 6 illustrates one embodiment of a lens array and reflective prism used to spatially separate the different wavelengths.

FIG. 6 illustrates one embodiment of a lens array and reflective prism used to spatially separate the different wavelengths from input beams 652 to output beams 662. In this embodiment, lens array 683 corresponding to lens array 383 has four elements, corresponding to the four rows of add-port and drop-port optical beams. Spatially dispersive element 673 corresponding to spatially dispersion element 373 has ten reflective surfaces, of which four are shown, and is made by a process similar to diamond-turning diffraction gratings.

Figure 7:
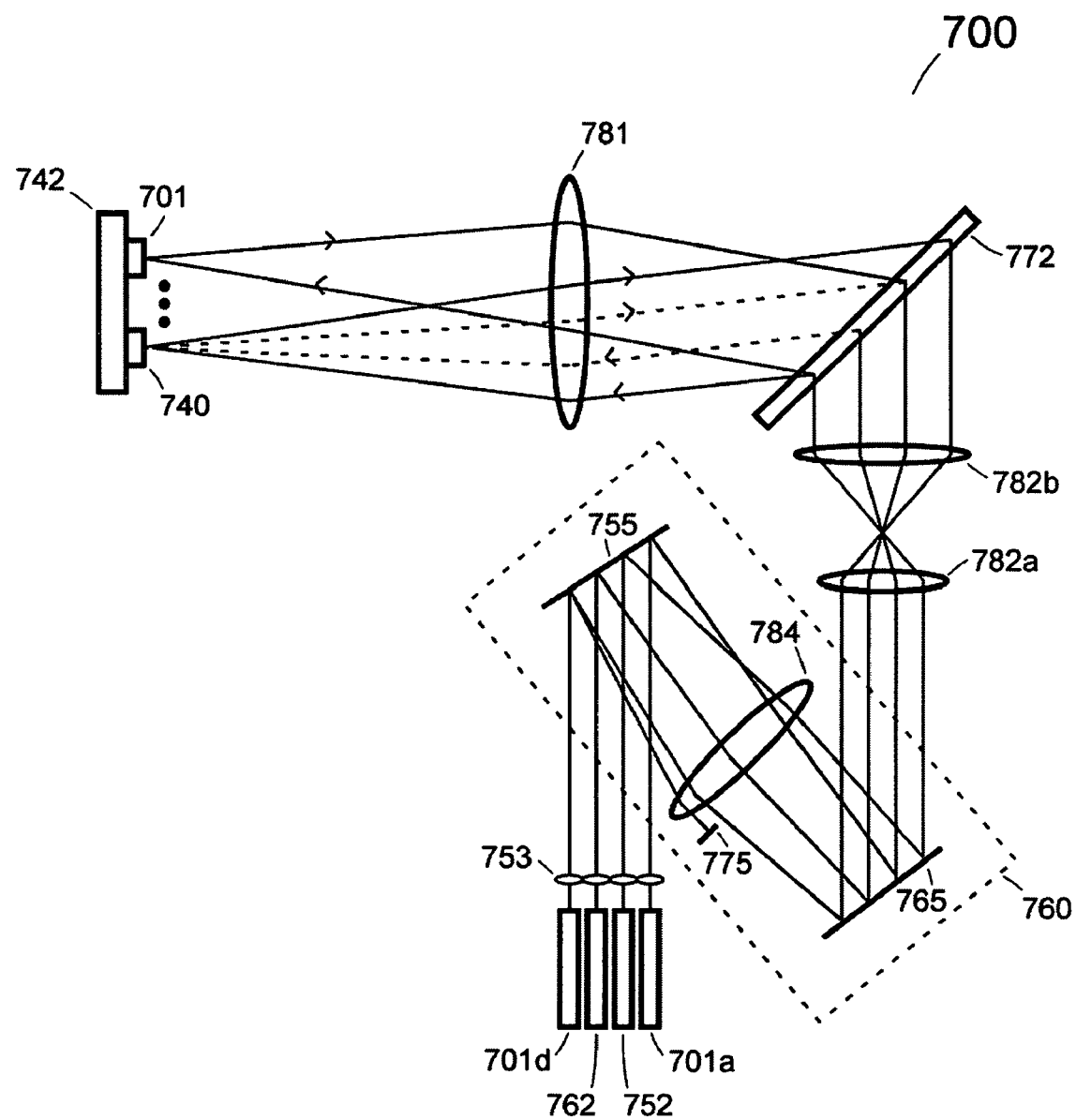
FIG. 7 illustrates an alternate embodiment of a free-space portion of the optical wavelength switch.

An alternative embodiment 700 of free-space wavelength switch 149 or 249 is shown in FIG. 7. Input fiber 752 and output fiber 762 correspond to input fiber 352 and output fiber 362, and each carry 40 wavelengths. Lens array 753 produces collimated beams from input fiber 753 and from up to 40 add-port fibers 701a–740a, although only one add-port fiber 701a is shown for clarity. Lens array 753 also couples the output beam into fiber 762 and up to 40 output wavelengths into 40 drop fibers 701d–740d, although only one drop-port fiber 701d is shown for clarity.

Two-dimensional arrays of mirror 755 and 765 together with lens 784 form a cross-connect switch 760 for free-space optical beams to allow any input wavelength to switch to any drop fiber 701d–740d, and any add-port fiber 701a–740a to connect to the output fiber 762. Fixed mirror 775 routes signals 141a and 141d to the opposite sides of switches 155 and 165 of FIG. 1, to allow bypassing a non-working wavelength of wavelength switch 300. Cross-connect switch 760 may also be used to correct mechanical drift of beam angle and position changes over temperature.

In an alternative embodiment, mirror arrays 755 and 765 are replaced by a single larger mirror array with input and output mirrors, and lens 784 is replaced by a curved fixed mirror to form a reflective optical switch configuration.

The input beam from fiber 752 passes through beam expander comprising lenses 782a and 782b in order to expand the free-space input beam from small optical beams in switch 760 to a larger optical beams incident on grating 772. Grating 772 separates different wavelengths of the input beam in angle. Lens 781 focuses each wavelength to a different mirror of mirror array 742. Mirror array 742 includes a linear array of 40 mirrors 701–740, with each mirror rotating in two axes. Each mirror 701–740 can steer a particular wavelength back through lens 781, grating 772, and beam expander 782b–782a to the output fiber 762 or to a drop-port fiber 701d–740d.

The configuration of free-space switch 700 is simpler than free-space switch 300, as the second pass through grating 372 and spatially dispersive element 373 is eliminated. However, the distance from grating 772 to mirror array 742 is significantly longer than the distance from grating 372 to mirror array 342 in order to achieve the required switching. This increased distance in free-space switch 700 decreases the alignment tolerance and other optical tolerances for achieving low optical loss from the input fiber to the output fiber. In order to minimize the optical clipping loss of mirrors in cross-bar switch 760, the mirrors corresponding to the input fiber 752 and output fiber 762 are larger than the mirror corresponding to add-ports and drop-ports, which have higher rotation angle requirements.

The position of the free-space optical beams of the add-ports and drop-ports at mirror array 765 relative to the input and output port is shown in FIG. 8a. The input port 852 corresponding to the beam from input fiber 752 is surrounded in the illustration by five columns of add-port beams 801a, and the output port beam 862 is surrounded in the illustration by five columns of drop-port beams 801d. In an exemplary embodiment, the input beam and output beam may be surrounded by at least 40 add-port beams or drop-port beams.

The positions of the input port beam and output port beam at mirror array 755 are chosen to minimize the required deflection angle of the input port mirror and output port mirror in mirror array 765. The optimum positions of the input and output beams are near the center of mirror array 755. The resulting positions of the input beam 853 and output beam 863 relative to five columns of add-port beams 802a and five columns of drop-port beams 802d at mirror array 755 are illustrated in FIG. 8b.

FIG. 9a illustrates an alternate embodiment spatially dispersive element 973 corresponding to reflective spatially dispersive element 373 of FIG. 3. In one embodiment, spatially dispersive element 973 includes of number of reflective prisms equal to the number of input wavelengths, each prism using its angled surface to reflect the output beam at a given wavelength to a desired angle. Inputs 901 and 903 diverge in angle due to wavelength dispersive grating 372 of FIG. 3. Spatially dispersive element 973 increases the divergence between output beams 911 and 913 by reflecting these beams at different angles. The prism faces of spatially dispersive elements 373 and 973 can be formed, for example, by diamond turning multiple faces on a cylinder blank, or other known means of fabricating multiple reflective surfaces. The prism faces can formed, for example, by selective etching of the substrate, followed by high temperature mass transport to smooth the prism surface. The mass transport method is well known in the art for fabrication of arbitrary lens shapes, and a prism is a special case of a lens. The prisms may also be formed, for example, by gray-scale lithography of photoresist material, then transferring the resulting prism from the photoresist to the semiconductor substrate by etching, or other known methods. In another embodiment, dispersive elements 373 and 973 may be formed by etching mirrors in silicon, with mirrors latching in angle so that each mirror is permanently set to a predetermined angle.

FIG. 9b illustrates a transmissive spatially dispersive element 974 corresponding to reflective spatially dispersive element 373 of FIG. 3. In one embodiment, spatially dispersive element 974 includes of a number of prisms equal to the number of input wavelengths, each prism face using its angled surface to refract the output beam at a given wavelength to a desired angle. The divergence of input optical beams 921–925 is increased by spatially dispersive element 974 to produce output optical beams 931–935 with higher divergence angles.

Figure 10:
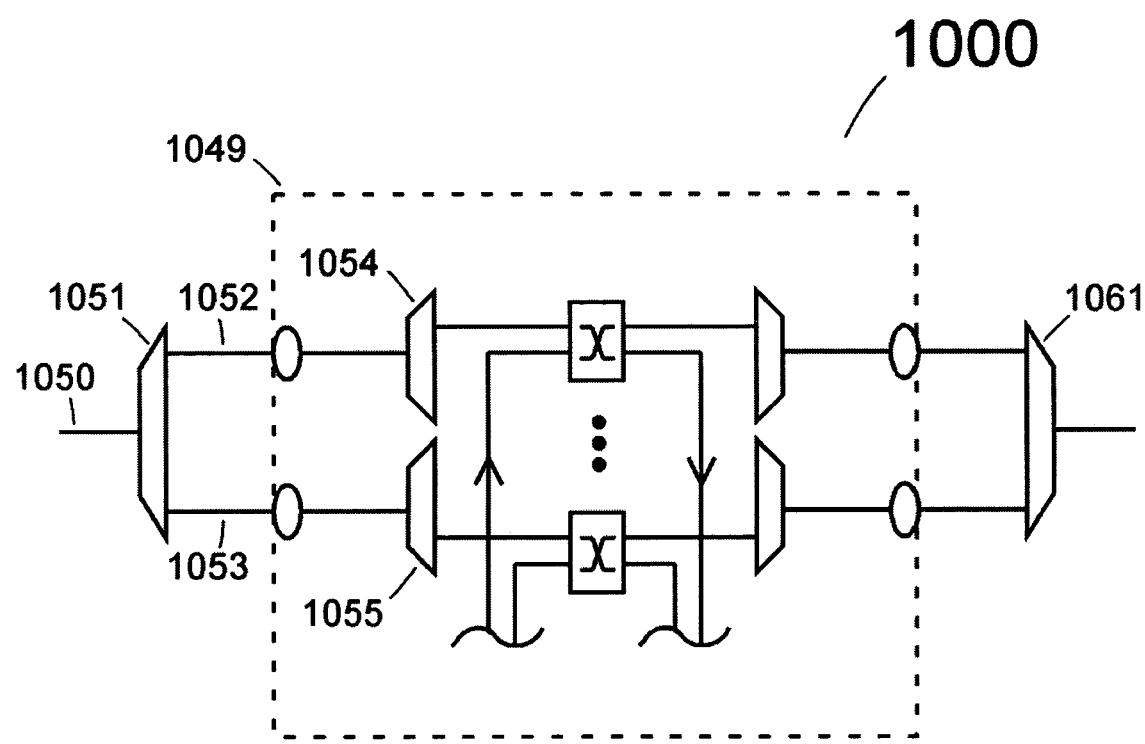
FIG. 10 illustrates one embodiment of external fiber demultiplexers and multiplexers to ease the yield requirement of the free-space demultiplexers and multiplexers.

One difficulty in fabricating prior art wavelength-selective optical switches is that they require 100% mirror yield within the array, and any mirror yield fallout produces wavelength blocking. One embodiment of the present invention that reduces the impact of mirror yield involves dividing the input wavelengths 1050 into subbands external to the free-space switch 1049 as illustrated in FIG. 10. This results in multiple free-space demultiplexers 1054 and 1055 having fewer output wavelengths that reduces the sensitivity to mirror yield. In one embodiment, four demultiplexers 1054 need ten working mirrors in a set, rather than 40 working mirrors required if a subband approach was not used. Using an external fiber-coupled demultiplexer 1051 and multiplexer 1061, the smaller number of wavelengths per free-space demultiplexer from fibers 1052 and 1053 reduces the possibility that any particular set of wavelengths will have a defective port, requiring the entire set of wavelengths to be unused to avoid wavelength blocking of the switch. In one embodiment, demultiplexer 1051 is a wavelength interleaver, which separates 40 wavelengths separated by 100 GHz to two fibers each carrying 20 wavelengths separated by 200 GHz.

Finite yield of mirror array 365 of FIG. 3 also can be accommodated by appropriate design of spatially dispersive element 373 of FIG. 3. This method of accommodating finite mirror yield is illustrated in FIG. 11 using a transmissive spatially dispersive element corresponding to 974 of FIG. 9b.

Figure 11:
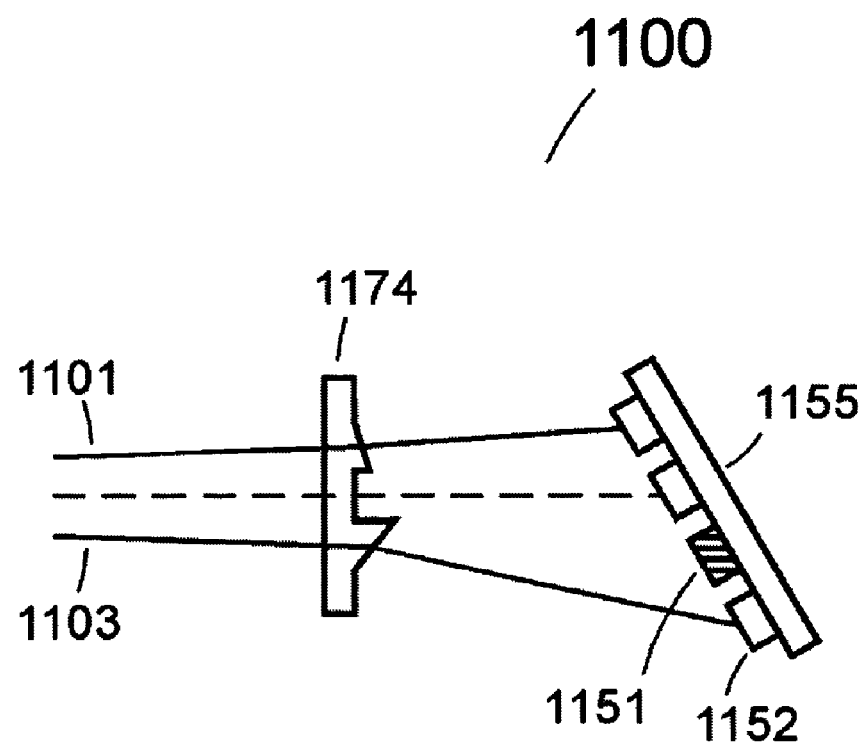
FIG. 11 illustrates one embodiment of an apparatus to accommodate finite mirror yield by matching deflection angles of the spatially dispersive device to working mirrors.

FIG. 11 illustrates one embodiment of an apparatus to accommodate finite mirror yield by matching deflection angles of the spatially dispersive device to working mirrors. In this embodiment, spatially dispersive element 1174 is custom fabricated to match the measured mirror yield of mirror array 1155. Spatially dispersive element 1174 directs optical beam 1103 to working mirror 1152 rather than nonworking mirror 1151. It should be noted again that the fibers, numbers of wavelengths, frequency spacings, ports, wavelength bands, etc. provided herein are only exemplary and the present invention is not intended to be limited thereto.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. An optical wavelength switch, comprising:
   an input port to receive a first beam having a plurality of wavelengths including a first wavelength;
   an add port to receive a second beam having the first wavelength;
   a cross-connect switch to receive the first beam from the input port and to receive the second beam from the add port;
   a wavelength dispersive element coupled to the cross-connect switch to receive the first beam from the cross-connect switch, the wavelength dispersive element to separate the plurality of wavelengths of the first beam into a plurality of free-space beams each having a separate wavelength, the free-space beams including a first free-space beam corresponding to the first wavelength and a second free-space beam corresponding to a second wavelength;
   a mirror array coupled to the wavelength dispersive element to receive the plurality of wavelengths of the first beam, the mirror array comprising a plurality of mirrors, each mirror rotatable in two axes;
   an output port to receive the second beam and the second free-space beam from the cross-connect switch; and
   a drop port to receive the first free-space beam from the cross-connect switch, wherein the input port, the add port, the output port and the drop port being arranged in a two-dimensional manner.

2. The optical wavelength switch of claim 1, wherein the mirror array comprises a one dimensional array of mirrors and wherein the cross-connect switch comprises two dimensional arrays of mirrors.

3. The optical wavelength switch of claim 2, further comprising a beam expander disposed between the cross-connect switch and the wavelength dispersive element.

4. The optical wavelength switch of claim 1, wherein the wavelength dispersive element comprises a grating.

5. The optical wavelength switch of claim 1, further comprising a lens coupled between the wavelength dispersive element and the mirror array to focus each of the plurality of wavelengths to a different mirror of the mirror array.

6. The optical wavelength switch of claim 5, wherein each mirror is configured to direct a particular wavelength of the plurality of wavelengths through the lens and wavelength dispersive element to at least one of an output fiber associated with the output port and a drop-port fiber.

7. The optical wavelength switch of claim 6, further comprising:
 an input fiber associated with the input port to propagate the first beam having the plurality of wavelengths; and
 a first input lens coupled to the input fiber to receive the first beam and form an input collimated beam, the first input lens coupled propagate the input collimated beam to the cross-connect switch.

8. The optical wavelength switch of claim 6, further comprising
 an add fiber;
 a second input lens coupled to the add fiber;
 a drop fiber; and
 a third input lens coupled to the drop fiber.

9. The optical wavelength switch of claim 8, wherein the cross-connect switch is configured to switch at least one wavelength of the first beam from the input fiber to one of the output fiber and the drop fiber.

10. The optical wavelength switch of claim 1, wherein the cross-connect switch comprises:
 a first plurality of mirrors, each rotatable in two axes;
 a second plurality of mirrors.

11. The optical wavelength switch of claim 10, further comprising a lens array coupled between the first and second plurality of mirrors.

12. The optical wavelength switch of claim 1, wherein the cross-connect switch comprises:
 a plurality of mirrors having input mirrors and output mirrors; and
 a fixed mirror coupled to the plurality of mirrors.

13. The optical wavelength switch of claim 12, wherein the fixed mirror is curved.

14. The optical wavelength switch of claim 1, wherein the cross-connect switch comprises a plurality of mirrors adjustable to accommodate beam angle and position changes over temperature.

15. The optical wavelength switch of claim 1, further comprising a wavelength interleaver coupled to the wavelength dispersive element, the wavelength interleaver to interleave a group of the separate wavelengths of the plurality of free-space beams.

* * * * *